Aug. 13, 1957   R. H. DREISONSTOK ET AL   2,802,284
EDUCATIONAL MEANS FOR VISUAL INSTRUCTION IN
THE OPERATION OF A KEYBOARD DEVICE
Filed Sept. 1, 1953                            2 Sheets-Sheet 1

INVENTORS
WILLIAM L. LLEWELLIN
& RICHARD H. DREISONSTOK
BY
McMorrow, Berman & Davidson
ATTORNEYS

INVENTORS
WILLIAM L. LLEWELLIN
& RICHARD H. DREISONSTOK
BY

ATTORNEYS

United States Patent Office 2,802,284
Patented Aug. 13, 1957

2,802,284

EDUCATIONAL MEANS FOR VISUAL INSTRUCTION IN THE OPERATION OF A KEYBOARD DEVICE

Richard H. Dreisonstok, Bethesda, and William L. Llewellin, Rising Sun, Md.

Application September 1, 1953, Serial No. 377,794

2 Claims. (Cl. 35—6)

This invention relates to educational devices, and more particularly to an improved means for teaching the operation of a keyboard device through visual projection.

A main object of the invention is to provide a novel and improved educational means for visual instruction in the operation of a keyboard device, said means being simple in construction, being easy to use, and providing a magnified projection of the movements of the instructor's fingers, simulating the movements of the fingers while operating an actual keyboard machine.

A further object of the invention is to provide an improved educational means employing visual projection, the educational means being arranged so that the instructor's fingers will be caused to simulate actual movements which would be undergone in the operation of an actual keyboard, for example in the operation of the keyboard of a typewriter, whereby the actual three-dimensional movements of the instructor's fingers are projected on an enlarged scale on a screen, stimulating the attention of the student and providing a more accurate demonstration of the actual movements involved in manipulating the keys of the machine than has been heretofore available for instructional purposes.

A still further object of the invention is to provide an improved educational device for visually demonstrating the finger movements involved in the operation of a keyboard machine of the type having rows of keys arranged at different levels, the improved device being inexpensive to fabricate, being compact in size, and being especially useful in teaching the art of touch-typing by providing a magnified demonstration of the finger movements involved in this activity, the device being so arranged that the student's attention will be directed to the projected image while the student is operating his machine, removing all incentive for causing the student to look at his keyboard or his hands, and stimulating the student to follow the hand movements demonstrated by the instructor and viewed by the student on the projection screen of the device.

Further objects and advantages of the invention will become apparent from the following description and claims, and from the accompanying drawings, wherein:

Figure 2:
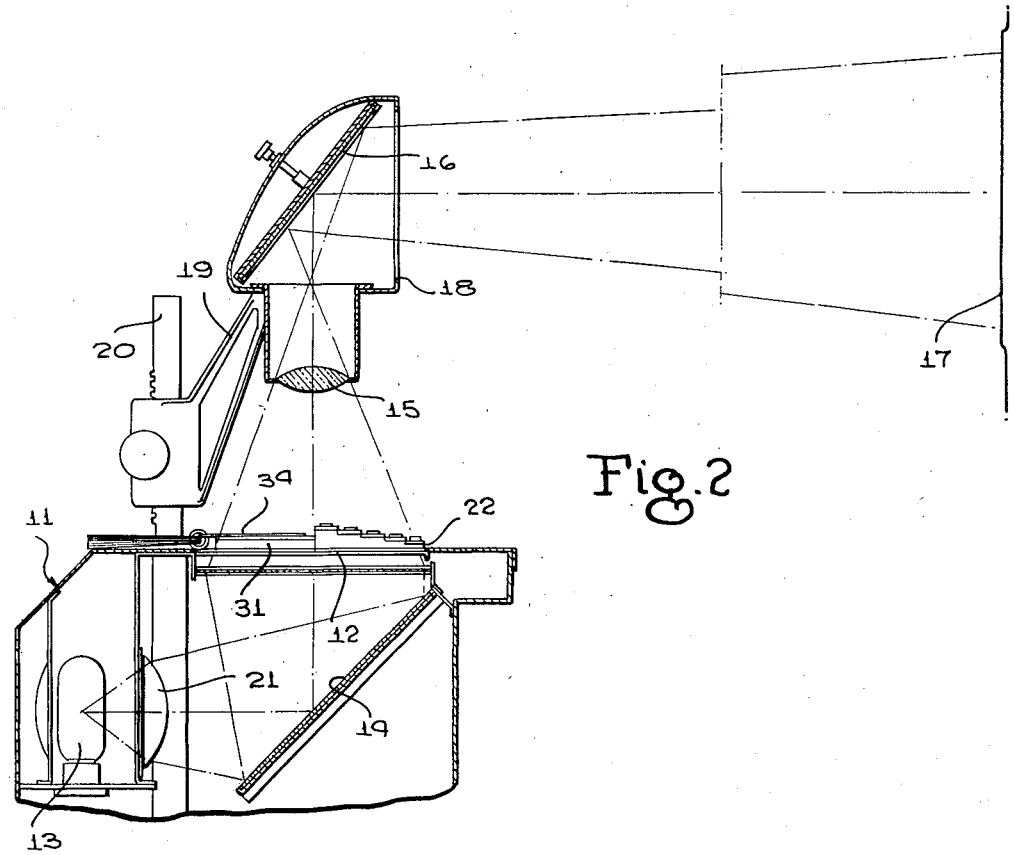
Figure 2 is a vertical cross sectional view taken through the projector employed in Figure 1 and illustrating schematically the relative arrangement of the parts of the projector in relation to the translucent, keyboard-simulating element forming part of the present invention.
Figure 4:
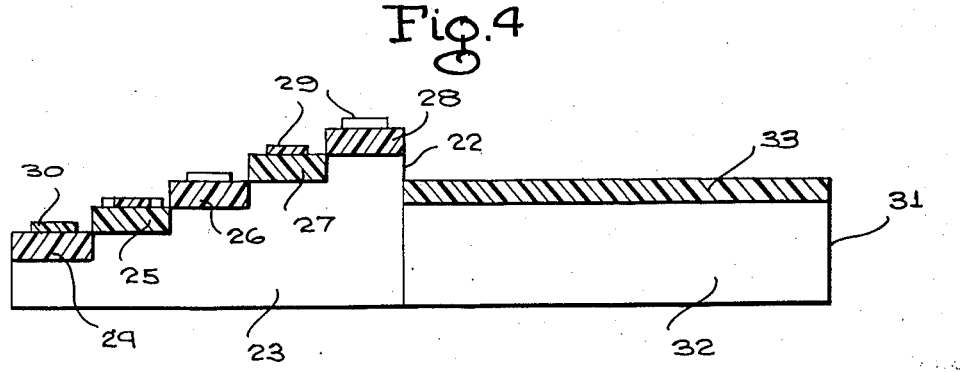
Figure 4 is an enlarged vertical cross sectional view taken through the keyboard-simulating body and the lesson board illustrated in Figure 3.

Referring to the drawings, 11 generally designates a projection apparatus of conventional construction of the type having a projection lamp 13, a mirror 14 positioned behind and spaced from the lamp and sloping in an upwardly and rearwardly direction, a horizontally disposed transparent stage 12 positioned above and in vertical spaced aligned relation with respect to the mirror 14, a horizontally disposed projection lens 15 arranged in superimposed spaced relation with respect to the stage 12 and another mirror 16 sloping in an upwardly and rearwardly direction fixedly positioned above and spaced from the projection lens 15. In this arrangement light from the lamp 13 and mirror 14 is projected upwardly, as shown in Figure 2, through the projection lens 15 to the mirror 16. The projected beam is reflected from the mirror 16 to a vertically disposed viewing screen 17 positioned rearwardly of and spaced from the mirror 16. As shown in Figure 2, the projection lens 15 and inclined mirror 16 are supported in a suitable housing 18 which is mounted on a bracket member 19 arranged to be vertically adjusted on an upstanding support member 20 for the purpose of focussing the lens 15 above the stage 12. The projector itself is entirely conventional in construction, and may be similar to the "Master Vu-Graph" manufactured by Charles Beseler Company, Newark, New Jersey.

From Figure 2 it will be seen that the light from the lamp 13 passes through a condenser lens 21 which forms the light into a beam, said beam being reflected by the inclined mirror 14 through the Fresnel lens and stage 12, and through the material disposed thereon for projection.

Designated at 22 is a keyboard-simulating member comprising a body of light transmitting material open at the bottom and having extending over the top thereof a plurality of stepped shelves carrying thereon the elements simulating the key operating elements of a typewriter keyboard. Specifically, this embodies a pair of vertical side supports 23, 23 formed with stepped top edges, and a plurality of translucent horizontal strips 24 to 28 having their end portions rigidly secured on the respective step notches of the side supports 23, 23, the strips 24 to 28 forming the stepped shelves. Thus, the translucent strips 24 to 28 are supported on different levels corresponding to the different levels of the rows of operating keys of a keyboard machine, such as a typewriter. Thus, the apparatus may be arranged for teaching touch-typing, and the keyboard-simulating device 22 will have its horizontal strip members 24 to 28 arranged at the various different levels of the rows of keys of a typewriter keyboard.

Figure 1:
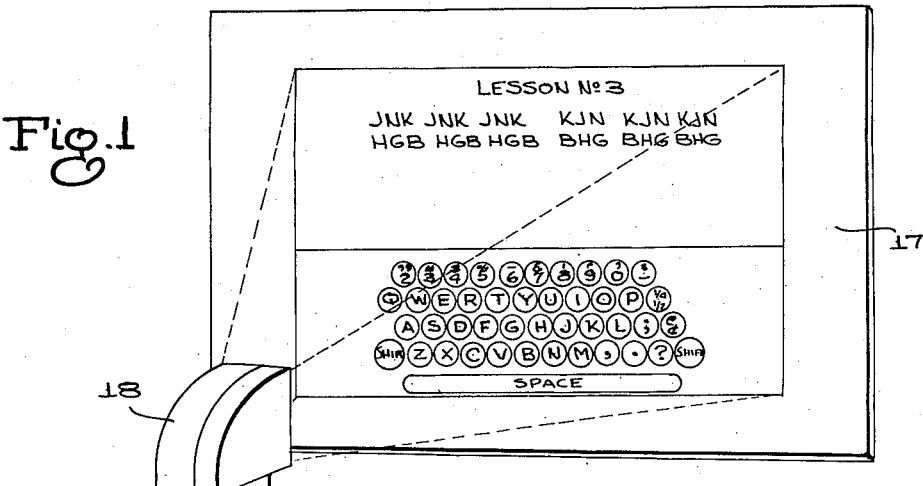
Figure 1 is a perspective view illustrating a typical projection system for teaching the operation of a keyboard machine and employing educational means in accordance with the present invention.
Figure 3:
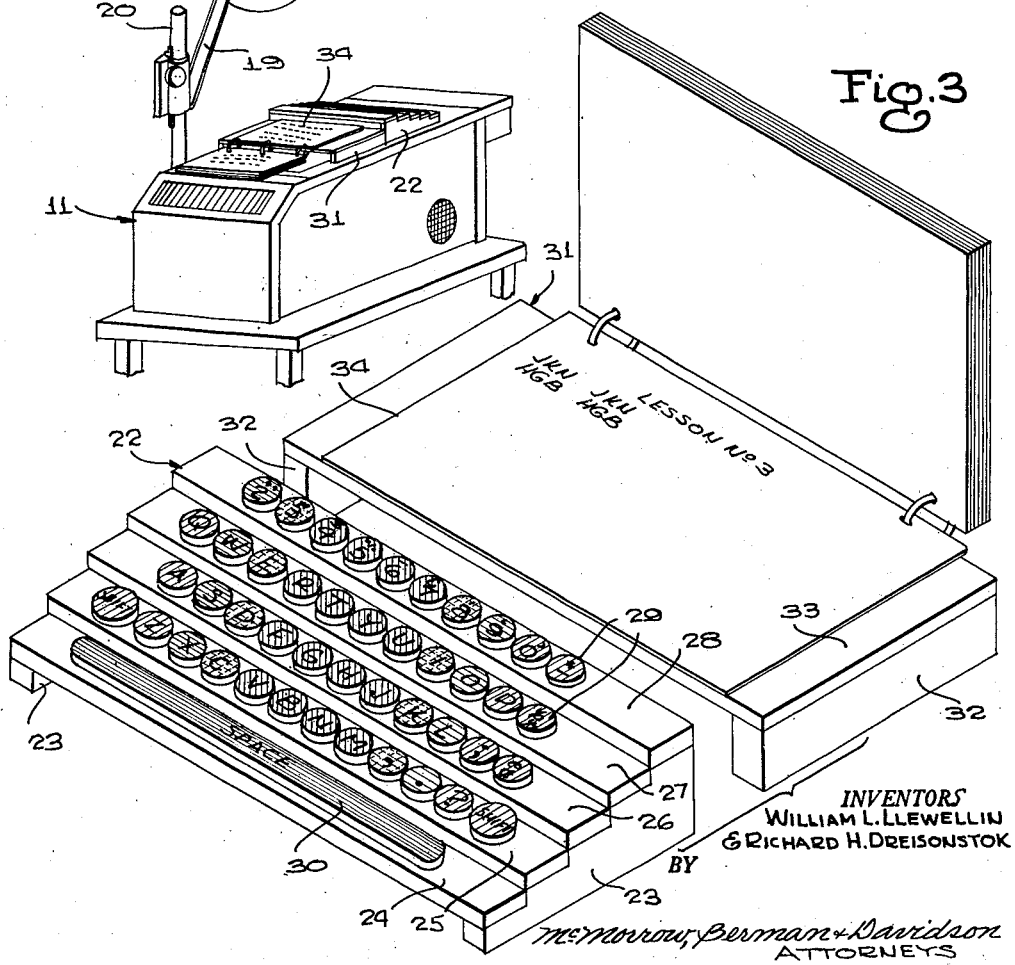
Figure 3 is a perspective view of the keyboard-simulating element and the lesson board associated therewith, as employed in accordance with the present invention.

Secured on the respective translucent strips 24 to 28 are tabs which are arranged and marked to simulate the arrangement of the operating elements of a typewriter keyboard. Thus, tabs 29 of circular shape may be secured on the strips 25, 26, 27 and 28, spaced in accordance with the spacing of the key-operating elements of a typewriter keyboard, and an elongated tab 30 may be secured on the lowermost strip 24, corresponding to the spacer bar of a typewriter. As is clearly shown in Figures 1 and 3, the indicia elements 29 are preferably differently colored in accordance with the different fingers which are to be engaged on the respective operating buttons in touch-typing.

The circular indicia elements 29, as well as the elongated spacer bar-simulating element 30 are preferably of translucent material, suitably tinted so as to show up when projected on a screen. The strips 24 to 28 are preferably of colorless translucent or transparent material to provide the necessary contrast with respect to the elements 29 and 30 when projected on the screen 17.

Designated generally at 31 is a lesson board comprising rectangular side bars 32, 32 on which is secured a translucent or transparent plate member or platform 33, the plate member 33 being substantially equal in length to the length of the keyboard-simulating body 22 and the plate member 33 being supported by the side bars 32 at an intermediate level between the level of the highest strip member 28 and the level of the lowest strip member 24. The lesson board 31 is adapted to receive a lesson card 34 of light-transmitting material inscribed with the lesson material intended to accompany a touch-typing demonstration.

In using the device, the keyboard-simulating body 22 is placed on the stage 12 with the lesson board 31 arranged adjacent thereto, as shown in Figure 2, whereby a projected image of the body 22 and the card 34 on lesson board 31 will be obtained on the screen 17. The instructor stands in front of the projector and demonstrates the finger movements associated with a given lesson on the stepped keyboard-simulating body 22, the movements of the instructor's fingers being projected onto the screen 17 and the various muscular actions of the fingers being clearly visible to the students watching the shadow projections of the fingers as they go through the various movements on the keyboard-simulating body 22 involved in demonstrating the lesson material inscribed on the lesson card 34 positioned on the board 31. Since the body 22 comprises stepped rows of indicia, arranged in the same relative spacial arrangement and relative elevation as the various key-operating buttons of a typewriter keyboard, the movements of the fingers of the instructor will take place in three dimensions, and the corresponding projections of the instructor's fingers will provide a three-dimensional effect which can be readily understood by the students and which can be accurately imitated. Thus, the projected image will demonstrate the natural movements of the instructor's fingers in going through a touch-typing exercise, and the projected image of the instructor's fingers will provide a three-dimensional demonstration of the finger actions involved in going through the lesson material. By providing a three-dimensional finger action, the transmission of this information to the student produces an effective understanding of the specific thought pattern and its related finger movements involved in the lesson material, and thus the instructor's objective can be accomplished in a comparatively short period of time.

Furthermore, the realistic projection of the instructor's finger movements increases the student's attention to the screen and removes all incentive for the student to look at his keyboard or his fingers. By appealing to the kinesthetic sense of the student, the speed of his learning is greatly increased, and the student is enabled to more accurately imitate the instructor's finger movements than by any method previously employed in the prior art.

While the apparatus described above has been illustrated in connection with teaching the art of touch-typing, it will be readily apparent that the device is broadly suitable for teaching the operation of any keyboard device having operating elements arranged at different levels.

The keyboard-simulating body 22 and the lesson board 31 may be made of any suitable material, such as plastic, glass, or any other transparent or translucent material through which light may be projected.

While a specific embodiment of an improved educational means for the visual instruction of students in the operation of a keyboard device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. The combination with a projection apparatus including a projection lamp, a mirror positioned behind and spaced from said lamp, said mirror sloping in an upwardly and rearwardly direction, a horizontally disposed transparent stage positioned above and in vertical spaced aligned relation with respect to said mirror, a horizontally disposed projection lens arranged in superimposed spaced relation with respect to said stage and another mirror sloping in an upwardly and rearwardly direction fixedly positioned above and spaced from said projection lens, said projection lens and another mirror being movable as a unit toward and away from said stage, and a vertically disposed viewing screen positioned rearwardly of and spaced from said another mirror, of an educational means for projecting visual instructions in the operation of a keyboard device comprising a body of light transmitting material and having a plurality of stepped shelves carrying thereon the elements simulating the key operating elements of a typewriter keyboard positioned upon said stage, a lesson transparent platform positioned behind said stepped shelves and supported on said stage, and a lesson card of light transmitting material supported on said platform, said platform being at a level intermediate the highest and lowest of said shelves.

2. The combination with a projection apparatus including a projection lamp, a mirror positioned behind and spaced from said lamp, said mirror sloping in an upwardly and rearwardly direction, a horizontally disposed transparent stage positioned above and in vertical spaced aligned relation with respect to said mirror, a horizontally disposed projection lens arranged in superimposed spaced relation with respect to said stage and another mirror sloping in an upwardly and rearwardly direction fixedly positioned above and spaced from said projection lens, said projection lens and another mirror being movable as a unit toward and away from said stage, and a vertically disposed viewing screen positioned rearwardly of and spaced from said another mirror, of an educational means for projecting visual instructions in the operation of a keyboard device comprising a body of light transmitting material open at the bottom and having extending over the top thereof a plurality of stepped shelves carrying thereon the elements simulating the key operating elements of a typewriter keyboard positioned upon said stage so that the bottom is adjacent the stage and the stepped shelves are spaced above the stage, a lesson transparent platfrom positioned behind said stepped shelves and supported on said stage and a lesson card of light transmitting material supported on said platform, said platform being at a level intermediate the highest and lowest of said shelves.

References Cited in the file of this patent

UNITED STATES PATENTS

| | | |
|---|---|---|
| 565,179 | Rhodes | Aug. 4, 1896 |
| 1,036,131 | Mayer | Aug. 20, 1912 |
| 1,262,180 | Davies | Apr. 9, 1918 |
| 1,984,599 | Safar | Dec. 18, 1934 |